United States Patent [19]
Martin et al.

[11] Patent Number: 5,542,976
[45] Date of Patent: Aug. 6, 1996

[54] REFRACTORY IMITATION FIREPLACE OBJECTS

[75] Inventors: Ed Martin, 301-1920 Alberni Street, Vancouver, British Columbia, Canada, V6G 1B5; Claude Simard, 28-3931 198th Street, Langley, British Columbia, Canada, V3A 1C9; Brad Thompson, Burnaby, Canada

[73] Assignees: Ed Martin; Claude Simard, both of British Columbia, Canada

[21] Appl. No.: 448,882

[22] Filed: May 24, 1995

[51] Int. Cl.$^6$ .............. C04B 7/32; C04B 14/46; C04B 14/18; C04B 14/20

[52] U.S. Cl. .............. 106/675; 106/672; 106/711; 106/712; 106/692; 106/698; 252/378 R; 252/378 P

[58] Field of Search .................. 106/675, 672, 106/711, 712, 698, 692

[56] References Cited

U.S. PATENT DOCUMENTS

| | | | |
|---|---|---|---|
| 1,302,452 | 4/1919 | Taylor et al. | 106/711 |
| 3,886,076 | 5/1975 | Venable | 252/62 |
| 4,100,115 | 7/1978 | Baer | 521/83 |
| 4,541,870 | 9/1985 | Barrett, Jr. | 106/96 |
| 4,544,409 | 10/1985 | Daussan et al. | 106/692 |
| 4,680,059 | 7/1987 | Cooke et al. | 106/120 |
| 4,786,450 | 11/1988 | Weidemann | 264/82 |
| 4,897,294 | 1/1990 | Libby et al. | 106/675 |

FOREIGN PATENT DOCUMENTS 1539972  2/1979  United Kingdom.

*Primary Examiner*—Mark L. Bell
*Assistant Examiner*—Louis M. Troilo
*Attorney, Agent, or Firm*—Christensen O'Connor; Johnson & Kindness PLLC

[57] ABSTRACT

A blend for producing refractory imitation fireplace objects comprises between 30% and 50% amorphous aluminum siliceous mineral silicate, between 1% and 5% fibre and between 40% and 60% high temperature cement. A method of producing a slurry for casting the refractory objects consists of blending the amorphous aluminum siliceous mineral silicate, the fibre, an aggregate and colorant, adding and blending a high temperature cement and a dispersant and adding between 35% and 45% by weight of water.

8 Claims, 1 Drawing Sheet

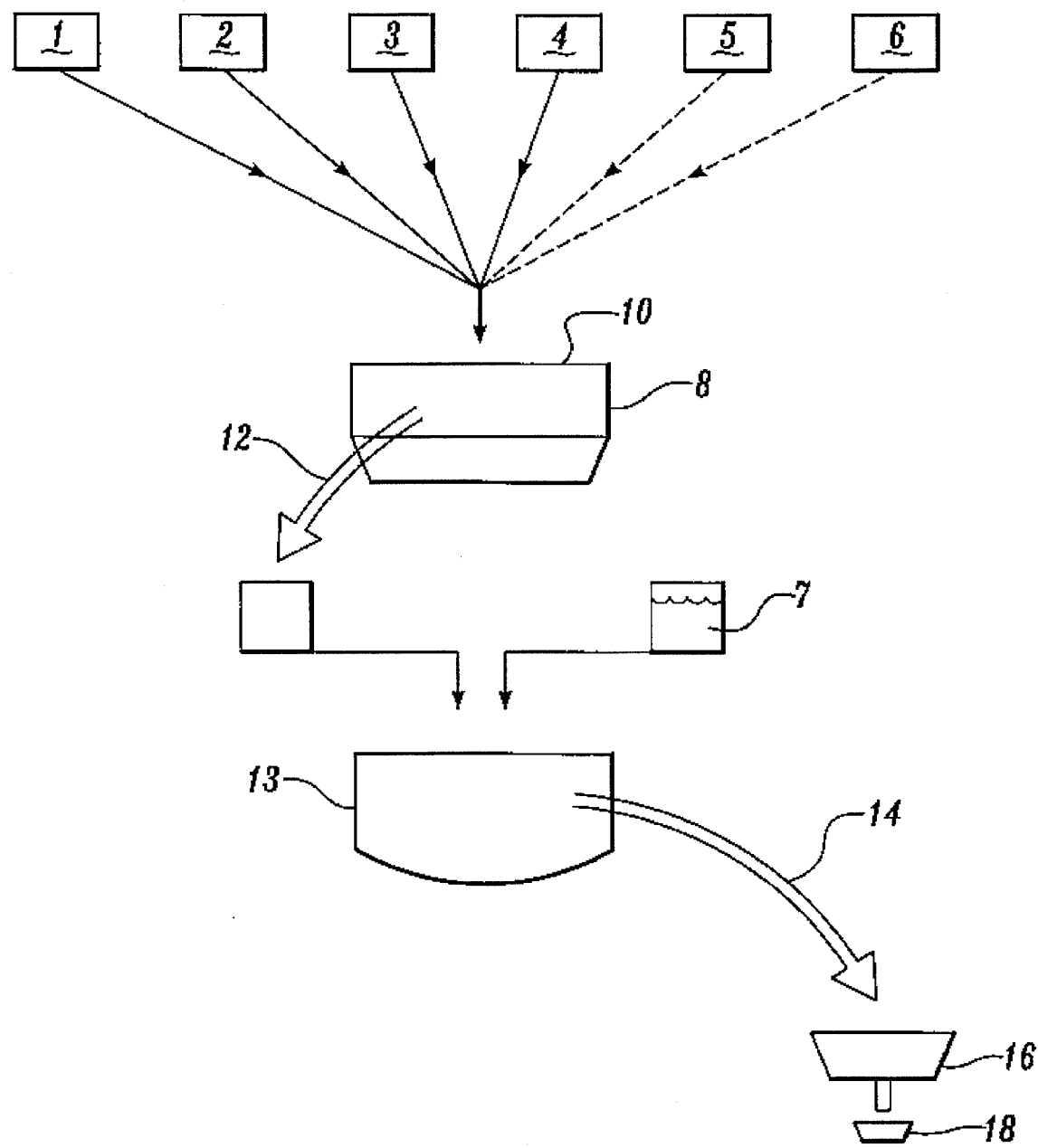

REFRACTORY IMITATION FIREPLACE OBJECTS

TECHNICAL FIELD OF THE INVENTION

This invention relates to producing improved refractory imitation firewood, coals, brick fascia boards and like objects.

BACKGROUND ART

Interest in the manufacture of imitation products to enhance the realistic look of economical metal zero-clearance, gas fireplaces is increasing due to the shift away from the traditional masonry fireplaces, because of cost and consumers' environmental concerns. Zero-clearance fireplace manufacturers usually do not make these imitation products in-house because of the specialized processes and to eliminate the contamination that can harm metal production machinery.

One conventional, albeit dusty and contaminating, method of producing low cost imitation refractory products is to mix the concrete, sand, aggregate, color, and water and to pour the blend into rubberized molds to set. The resulting product is a very heavy and dense composition that is subject to easy breakage and is expensive to transport to the end user. Another disadvantage to this concrete-type product is that when exposed to the heat and flames of gaseous fuels, they emit no glow and little radiant heat. This results in the unwanted buildup of carbon on their surface. A further drawback is that unless these products are evenly weight supported, they will crack and disintegrate under stressful burning conditions.

Another conventional method of producing imitation refractory fireplace products is the more complex, hollow ceramic process of molding clay, drying, then firing the same to produce a bisque. A desired glazing compound is then surface applied, dried, and refired to bake. This is an expensive and time consuming operation which requires two firings and two drying steps. The result produces lightweight products that will glow when set over a bar or ribbon type gaseous burner, but the porcelain-like ware is extremely fragile to transport. Another disadvantage is their limited use as they cannot be placed on popular fireplace sand pans because they will absorb the gaseous fumes and under heat, explode.

A third conventional way to produce imitation refractory fireplace products is the vacuum extraction method, which requires custom-made machinery and molding processes to form a fibre composition product. After drying, external stiffening agents must be applied for the product to maintain a rigid shape, and colors applied thereafter. While this product is lightweight, glows, and can be utilized on sand pan fireplaces, it flakes and crushes easily when transported. As the fibrous core remains soft and pliable, under humid conditions, it will absorb moisture which accelerates disintegration.

It is therefore the general object of the present invention to provide an improved material and method for producing refractory imitation firewood, coals, brick fascia boards and like objects which will obviate the above mentioned disadvantages, yet provide the desired advantages, namely a product that possesses solid mass, is lightweight, does not disintegrate and produces a red ember glow over fire with a high degree of radiant heat capable of repelling carbon buildup.

Another object of the present invention is to enable the use of rubberized molding methods which is the least costly of the foregoing processes while providing the best aesthetic definition.

Another object of the present invention is to employ inexpensive materials that are readily available and will result in lower end product cost.

Another object of the present invention is to utilize a simple process that is consistently repeatable and can be accomplished in-house without harmful effects to a manufacturer's other machinery operations and afford a substantial savings over outside suppliers' finished products.

Another object of the present invention is to provide a product that is lighter than concrete, is resistant to damage when transported, will not flake or crush, is moisture resistant, and possesses solid colour throughout its texture.

SUMMARY OF THE INVENTION

In one aspect, the invention comprises a blend for producing refractory imitation firewood, coals, brick fascia boards or the like, comprising between 30% and 50% by weight of amorphous siliceous mineral silicate, between 1% and 5% by weight of fibre, between 40% and 60% by weight of high temperature cement.

In another aspect, the invention comprises the blend referred to above and further includes between 5% and 15% by weight aggregate and between 0.1% and 0.5% by weight dispersant.

In yet another aspect, the invention comprises a method of producing a mold mixture for refractory imitation firewood, coals, brick, fascia boards or the like, comprising the steps of combining fibre, aggregate, and perlite and mixing them until the fibre has been dispersed in the blend, adding high temperature cement and dispersant, mixing them, and adding water to the resulting blend in a ratio of between 35% and 45% by weight in relation to the dry blend.

BRIEF DESCRIPTION OF THE DRAWINGS

The foregoing and other important objects of the present invention will become apparent during the following disclosure and by referring to the drawings in which:

Table I sets out the relative proportions of ingredients according to the preferred embodiment of the invention.

FIG. 1 is a schematic flow sheet of the method according to the invention.

DETAILED DESCRIPTION OF BEST MODE AND PREFERRED EMBODIMENT OF THE INVENTION

The following ingredients are used in the preferred embodiment of the invention:

1. Perlite
2. Fibre
3. Aggregate
4. Colorant
5. High temperature cement
6. Dispersant
7. Water Perlite "Perlite" is a commonly used tradename for a product consisting of expanded quartz rock, namely amorphous siliceous mineral silicate. It generally comprises sodium, potassium and aluminum silicate in varying proportions. The product known is also sometimes referred to as "vermiculite". The product is bulky, lightweight relatively abrasive and it glows when it is heated.

Perlite may be acquired in commercial quantities, for example, from W. R. Grace of Cambridge, Mass. and is sold with a coating resulting from a silicone water emulsion. Such coated Perlite is used in the preferred embodiment of the invention because of the contribution of the coating to keeping the dust levels low. It is contemplated that other abrasive, lightweight coated aluminum silicates which glow when heated could be substituted for Perlite.

Fibre

The fibre used in the preferred embodiment is a man made vitreous fibre commonly referred to as rock wool. It is available in commercial quantities from Partek Insulation of Sarnia, Ontario, Canada.

Aggregate

The aggregate of the preferred embodiment is commonly known as "engine sand" consisting of untreated sand. It has been observed that treated sand is not as suitable for use in the invention as is untreated engine sand. However, as the selection of the aggregate is not critical to the invention, it is within the scope thereof to use alternate aggregates.

Colorant

The colorant may be any suitable heat-stable colorant but is preferably 60–80 mesh manganese dioxide, available from Canada Colors and Chemicals Limited of Don Mills, Ontario.

High temperature cement

The high temperature cement of the preferred embodiment is a calcium aluminate cement commonly referred to as "Fondu". It is available from LaFarge Calcium Aluminate of Chesapeake, Va., United State of America.

Dispersant

The dispersant of the preferred embodiment is an aqueous solution of modified naphthalene sulfonate, commonly referred to as a plasticizer. It is available from W. R. Grace & Co. of Lexington, Mass.

Generally, the ingredients are blended as described below to produce a dry blend. The dry blend may then be mixed with water to produce a slurry which is poured into molds to cast the refractory materials, such as imitation fireplace logs, bricks, fascia boards, coals or like objects wherein it is desirable that such objects glow when subjected to flame.

Referring now to FIG. 1, the coated Perlite 1, fibre 2, engine sand 3, and colorant 4 are combined in the proportions indicated in Table I. In the batch example used for Table I, 500 grams of fibre, 7.45 kg of coated Perlite, 2 kg of engine sand and a mix of 500 grams of black colorant and 500 grams of brown colorant are used.

The combined ingredients are placed in a ribbon blender 8 and are blended for 3 to 10 minutes. The blending causes the fibre 2 to be dispersed within the blend 10. It is believed that this due at least in part to the abrasive quality of the coated Perlite. The coating of the Perlite also plays a significant role in keeping the dust level low. Note that the use of colorant is optional. It is preferably introduced into the blend at the same time as the coated Perlite, fibre, and engine sand.

Once the coated Perlite, fibre, engine sand and colorant have been blended for 3 to 10 minutes, the blender 8 is stopped and the high temperature cement 5 and dispersant 6 are added. In the batch example used for Table I, 10 kg of high temperature cement 5 and 50 grams of dispersant 6 are used. The dispersant 6 acts as a strengthener for the mix and contributes to its fluidity. We have found that the dispersant is not essential to the invention but is desirable as it accelerates the drying process in the mold.

The ingredients, now including the high temperature cement 5 and the dispersant 6, are then blended for a further 5 to 12 minutes.

The resulting dry blend 12 is crumbly, easy to handle, and produces little dust. It may be bagged for later use or immediately processed to produce a slurry for a mold.

In order to produce a slurry for a mold, water 7 in a ratio of about 0.7 to 1 by weight is added to the dry blend 12 in a cement mixer 13. At an ambient temperature of 10° to 25° C., the correct blended slurry will be achieved in 8 to 12 minutes of mixing. The resulting slurry 14 should be creamy, smooth and easy to work. The slurry 14 is transferred to a hopper 16 or similar slurry handling system and dispensed into molds 18 to set in four to six hours depending on individual product size. The molds 18 are constructed of a suitable flexible rubberized or polyurethane substance. After demolding, the product is dried for about 24 hours. The product can then be used and will sustain no damage if subjected to intense flame. It will be appreciated by those skilled in the art that this relatively short mold-to-use time is an improvement over conventional concrete products. When subjected to flame, the fibre and Perlite in the product of the invention is very quickly activated and produces a brilliant red-ember glow.

We have found that the use of the coated Perlite in conjunction with the fibre and the high temperature cement results in a blend which may be produced without excessive dust, provided the coated Perlite is introduced early in the mixing process. This combination of ingredients also results in a final moulded product which is 50 to 70% lighter than conventional refractory concrete products.

It will be appreciated by those skilled in the art that certain variations may be made to the preferred embodiment described herein without departing from the scope of the invention.

TABLE I

| INGREDIENT | PREFERRED WEIGHT (%) | RANGE (%) | BATCH EXAMPLE |
| --- | --- | --- | --- |
| Fibre | 2.3 | 1 to 5 | 500 grams |
| Aggregate | 9.3 | 5 to 15 | 2 kg |
| Coated Perlite | 37 | 30 to 50 | 7.95 kg |
| Colorant (500 grams of black and 500 grams of brown) | 4.7 (total) | 3 to 8 (total) | 1 kg |
| High Temperature Cement | 46.5 | 40 to 60 | 10 kg |
| Dispersant | 0.2 | 0.1 to 0.5 | 50 grams |
| Total Dry Ingredients: | 100% | | 21.5 kg |
| Water: | 14.5L | 13L to 16L | |

What is claimed is:

1. A blend for producing refractory materials that glow when exposed to a flame in a gas fireplace, the materials comprising: between 30% and 50% by weight amorphous siliceous mineral silicate; between 1% and 5% by weight of fibre; and between 40% and 60% by weight of high temperature cement.

2. The blend according to claim 1, further comprising between 5% and 15% by weight aggregate; and between 0.1% and 0.5% by weight dispersant.

3. The blend according to claim 2, wherein said aggregate comprises engine sand and said fibre comprises rock wool.

4. The blend according to claim 1, wherein said amorphous siliceous mineral silicate is coated by silicone-water emulsion.

5. The blend according to claim 3 or 4, further comprising between 3% and 8% heat stable colorant.

6. A slurry for use in producing refractory materials that glow when exposed to flame for use in a gas fireplace, the slurry comprising: between 35% and 45% by weight of water mixed with a blend comprising between 30% and 50% by weight amorphous siliceous mineral silicate; between 1% and 5% by weight of fibre; between 40% and 60% by weight of high temperature cement; between 5% and 15% by weight aggregate; and between 0.1% and 0.5% by weight dispersant.

7. The slurry according to claim 6, wherein said aggregate is engine sand and said fibre comprises rock wool.

8. The slurry according to claim 6, wherein said amorphous siliceous mineral silicate is coated by silicone-water emulsion.

* * * * *